United States Patent
Dulac

(10) Patent No.: US 6,694,518 B1
(45) Date of Patent: Feb. 17, 2004

(54) METHOD AND APPARATUS FOR CARRYING DATA ACROSS HIGH DEFINITION ANALOG COMPONENT VIDEO INTERFACES

(75) Inventor: Stephen P. Dulac, Santa Clarita, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 637 days.

(21) Appl. No.: 09/583,058

(22) Filed: May 30, 2000

(51) Int. Cl.[7] .......................... H04N 7/08; H04N 7/087; H04N 7/084
(52) U.S. Cl. .................. 725/136; 725/137; 725/131; 725/139; 725/151; 725/100; 348/476; 348/478; 348/473; 370/487; 370/490
(58) Field of Search ................................. 725/136, 137; 348/460, 473; 370/486, 487, 490

(56) References Cited

U.S. PATENT DOCUMENTS

| | | | | |
|---|---|---|---|---|
| 5,585,858 A | * | 12/1996 | Harper et al. | 348/485 |
| 6,025,882 A | * | 2/2000 | Geshwind | 375/240.26 |
| 6,133,937 A | * | 10/2000 | Van Gestel | 725/114 |
| 6,160,587 A | * | 12/2000 | Walker et al. | 348/478 |
| 6,557,172 B1 | * | 4/2003 | Carr | 725/139 |
| 6,578,201 B1 | * | 6/2003 | LaRocca et al. | 725/86 |
| 2003/0149993 A1 | * | 8/2003 | Son et al. | 725/132 |

* cited by examiner

Primary Examiner—John Miller
Assistant Examiner—Johnny Ma
(74) Attorney, Agent, or Firm—John A. Crook; Michael W. Sales

(57) ABSTRACT

A method, apparatus, article of manufacture for generating a video signal having an auxiliary data payload complying with a data payload protocol selectable from at least two available data payload protocols is disclosed. An exemplary embodiment of the method comprises the steps of generating a data reference signal (which describes an auxiliary data payload protocol including an auxiliary data payload clock speed) at a baseline clock speed compliant with both of the two data protocols; appending the auxiliary data payload signal at the auxiliary data payload clock speed to the data reference signal; and inserting the data reference signal and the appended auxiliary data payload signal in a portion of at least one line of a video frame. An exemplary embodiment of the apparatus comprises a generator, for generating at least one line of a video frame having a data reference signal at a baseline clock speed compliant with two data protocols and an appended auxiliary data payload. The data reference signal is compliant with the two data protocols and describes a selected auxiliary data payload protocol including the auxiliary data payload clock speed.

26 Claims, 8 Drawing Sheets

METHOD AND APPARATUS FOR CARRYING DATA ACROSS HIGH DEFINITION ANALOG COMPONENT VIDEO INTERFACES

BACKGROUND OF THE INVENTION

1. Field of the Invention

The present invention relates to systems and methods for the transmission of video and related information, and in particular to a system and method for transmitting and receiving auxiliary data at a plurality of selectable clock speeds as a part of a high definition video signal.

2. Description of the Related Art

Standard analog color TV broadcasting techniques developed over 50 years ago have allowed the design of inexpensive television receivers that can provide remarkably good picture quality. Nonetheless, recent advances in transmission bandwidth and compression techniques have aroused considerable interest in high definition television (HDTV). HDTV, which is currently available on a limited basis in selected media markets, offers much higher picture quality than ordinary television sets.

Standard television receivers use an interleaved scanning technique that provides for horizontal blanking intervals between lines and vertical blanking intervals between each field of the interleaved picture frame. Standard television sets are capable of broadcasting auxiliary information associated with the television program by transmitting the information during the vertical blanking interval of the scanning television signal. Specially equipped television receivers can receive this information and provide it to the viewer. In the past, this technique has been used to provide low bandwidth information.

DTV is capable of delivering auxiliary data at a much higher rate than was possible with conventional television broadcasts.

FIG. 1 is a block diagram illustrating a system 100 for transmitting and receiving a digital television (DTV) signal comprising video, audio, and auxiliary information. Data packetization techniques are used to combine video, audio, and auxiliary information for each of a multiple of program streams into a single digital transport stream. The transport stream is suitably modulated and transmitted to a program receiver 110 or set top box. The program receiver 110 receives the modulated signal, and separates the video, audio, and auxiliary data into its component parts. Each component part is then routed to the appropriate devices. The program receiver 110 may also receive the video, audio, and auxiliary information via component interfaces.

As shown in FIG. 1, one or more video signals are provided from a program provider 102 to a program receiver 110 via satellite 104 or terrestrial transmitter 106 broadcast or cable/internet 108 to a program receiver 110 and thence provided to one or more inputs 112, 114, 116, 118 and 120 to one or more presentation devices 122, 124 and 126. Inputs 112, 114, 116, 118 and 120 may also be provided to a recording/playback device 128, which can record the input signals 112, 114, 116, 118 and 120 and provide the recorded input signals 112, 114, 116, 118 and 120 when required.

Inputs 112, 114, 116, 118 and 120 include a plurality of video component signals. These include audio signal(s) 112, and various video signals including a luminance signal 114, a first color signal 116 (typically, hue), a second color signal 118 (typically, intensity) and auxiliary data signal(s) 120.

As is well known and as previously noted, DTV signals are typically broadcast as digital bitstreams, typically utilizing a time division multiplex packet stream. In such systems the video component signals are encoded as digital information utilizing suitable protocols, and included in the broadcast bitstream. In some known devices the video (and/or audio) information is output from the program receiver 110 to the video presentation device 124 in a digital format. For example, the National Cable Television Association (NCTA) has recently proposed standards for utilizing an IEEE 1394 serial interconnect for connecting cable receiver boxes to ATSC compatible display devices. In such a system, the video information is communicated in packetized digital format and interpreted within the television receiver as needed (e.g. utilizing an MPEG-2 decoder). There are both advantages and disadvantages to digital interconnects of this type as compared to interconnects utilizing analog signals to communicate the video information. Due to its digital nature, it is straightforward to include auxiliary data within the communicated bitstream, including locally-generated data. Further, there are known techniques for securing the communication between devices using digital technology, such as encryption techniques (e.g. the DTCP-5C technology proposed for use with IEEE 1394). However, known affordable digital interconnect systems have bandwidth limitations that limit their desirability for communicating certain forms of video information. By way of example, a typical uncompressed digital HDTV video signal requires a bandwidth which exceeds the capability of the IEEE 1394 interconnect.

Because of these and other limitations, it is often desirable to use an analog interconnect utilizing analog waveforms representing the various video (and optionally, audio) information. Video component signals can be embodied in a number of different known or alternative analog forms, such as red, green, and blue (RGB) components, or luminance, scaled red-luminance, and scaled blue-luminance signals (Y, Pr, and Pb) component signals among others. Such analog video signals typically incorporate blanking intervals analogous to those defined in the NTSC standards, including vertical blanking intervals (VBI). In a system wherein the broadcasts are in digital format, the program receiver 110 includes circuits for generating the analog video waveforms and for structuring the respective outputs in a format having blanking intervals including VBI. By way of example and referring again to FIG. 1, the analog signals utilized for interconnecting a receiver 110 to a presentation device 124 in a typical HDTV system might include audio signal(s) 112 in either analog (e.g. FM) or digital (e.g. MPEG or AC-3) format, an analog luminance signal 114, an analog first color signal 116, an analog second color signal 118, and auxiliary data 120. Each of the video signals 114, 116 and 118 typically include a VBI, and some or all of the auxiliary data 120 can be communicated by use of one or more of these VBIs.

While the systems described above allow the transmission of auxiliary data to the video presentation device 124 for display (i.e. closed captioning) or to other devices for other use (i.e. copy protection), the sub-systems necessary to receive and decode the auxiliary data signals in the video presentation device 124 are not inexpensive. Further, the cost of these subsystems typically increases as the bandwidth of the auxiliary data increases. For example, more complex circuitry is required to receive and decode data at higher clock speeds. Since some viewers may require higher bandwidth auxiliary data services, and some may not, this can result in unnecessarily expensive video devices (e.g.

video presentation devices 124) for most consumers, or the inability to transmit auxiliary data having higher bandwidth requirements to any users at all. What is needed is a system that provides for secure transmission of auxiliary data information of different data rates to a wide variety video devices. The present invention satisfies that need.

SUMMARY OF THE INVENTION

To address the requirements described above, the present invention discloses a method, apparatus, article of manufacture for generating a video signal having an auxiliary data payload complying with a data payload protocol selectable from at least two available and differing data payload protocols.

An exemplary embodiment of the method comprises the steps of generating a data reference signal (which describes an auxiliary data payload protocol including an auxiliary data payload clock speed) at a baseline clock speed compliant with both of the two data protocols; appending the auxiliary data payload signal at the auxiliary data payload clock speed to the data reference signal; and inserting the data reference signal and the appended auxiliary data payload signal in a portion of at least one line of a video frame. An exemplary embodiment of the apparatus comprises a generator, for generating at least one line of a video frame having a data reference signal at a baseline clock speed compliant with two data protocols and an appended auxiliary data payload. The data reference signal is compliant with the two data protocols and describes a selected auxiliary data payload protocol including the auxiliary data payload clock speed.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
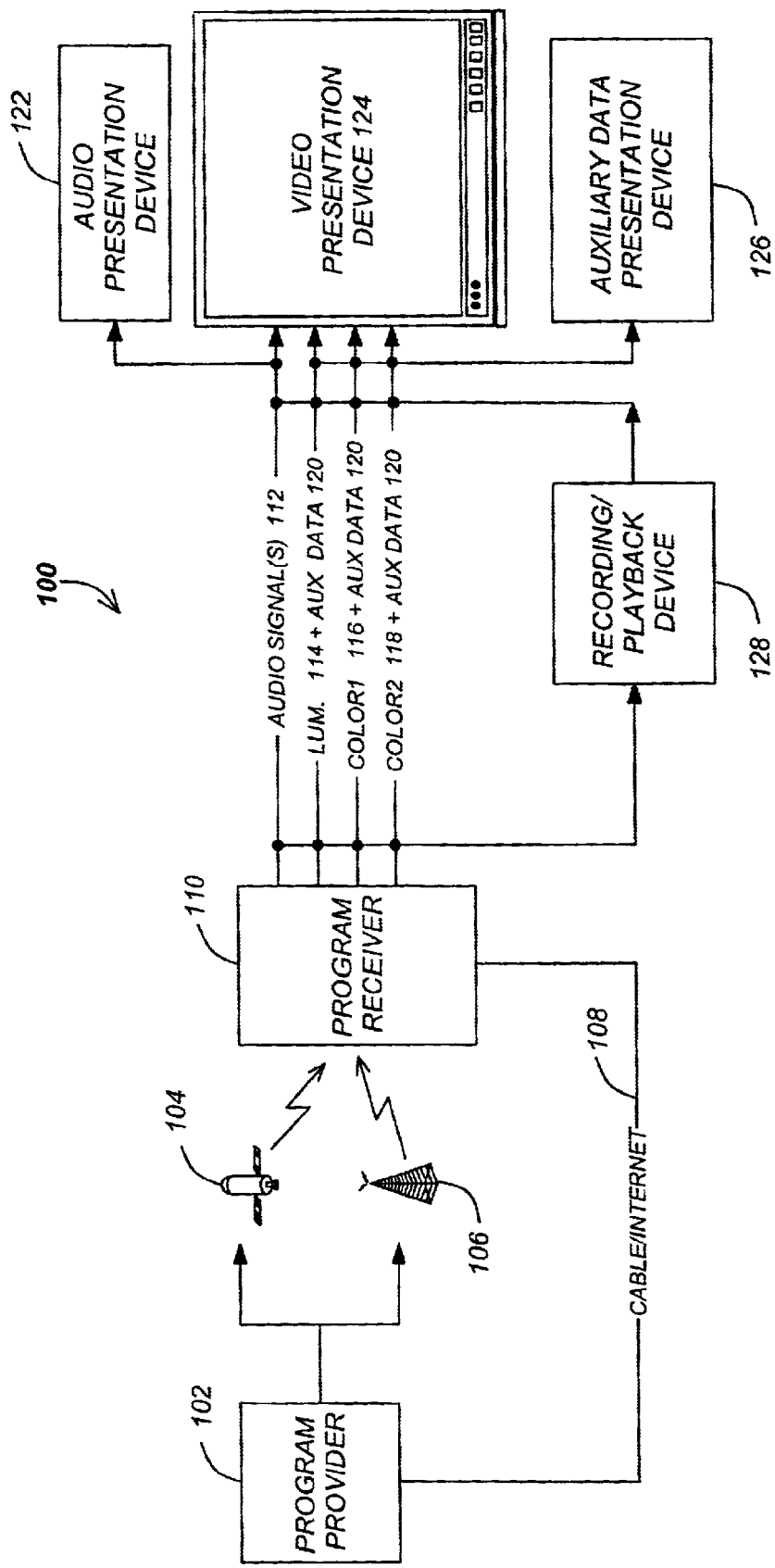
FIG. 1 is a block diagram illustrating the transmission and reception of a signal comprising video, audio, and auxiliary information.
Figure 2:
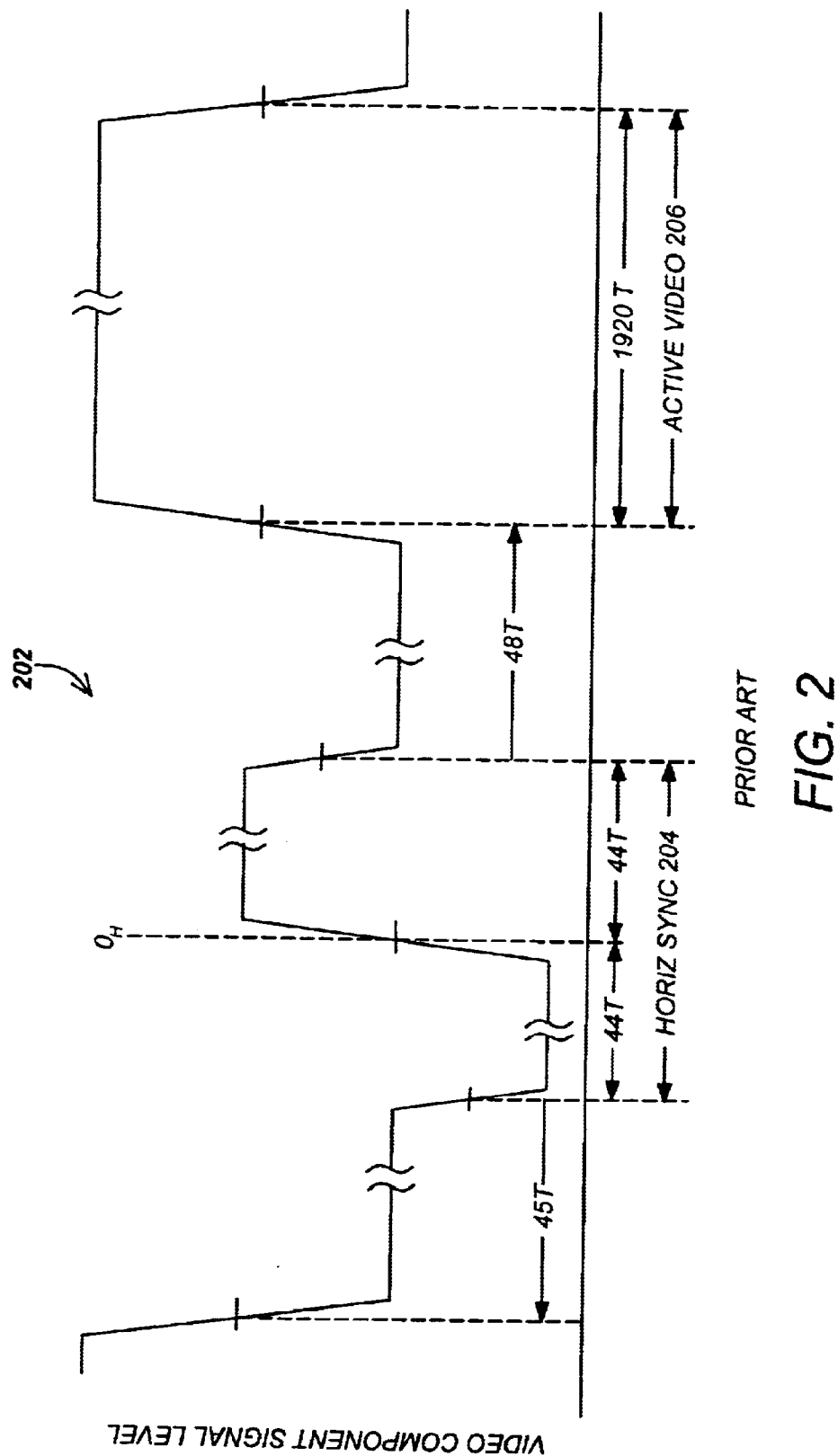
FIG. 2 is a diagram showing a component waveform such as a luminance signal for a video signal.

FIG. 2 is a diagram showing a prior art component video waveform 202 for one video line. The component video waveform 202 may comprise any one of the components of the video signal (e.g., the luminance component 114, the first color component 116, or the second color component 118). Alternatively, the video signal may comprise either the luminance component or color component of an S-video signal or a single video signal suitably modulated with the luminance component signal 114, and the first and second color component signals 116 and 118. The waveform timing and pulse shape presented in FIG. 2 represents that of a particular HDTV format. This waveform includes a horizontal synchronization pulse 204 centered at $0_H$ which is 88 clock periods (T). Where the video signal is an HDTV signal, for example, the clock period T is about 74 MHz. The video signal also includes an active video region 206. When the component waveform 202 represents a line in a vertical blanking interval (VBI), the active video region 206 is normally blank. Conversely, when the component waveform 202 represents a non-VBI line, the active video region 206 includes video program data. The active video portion 206 is typically 1920 clock periods in length.

Figure 3:
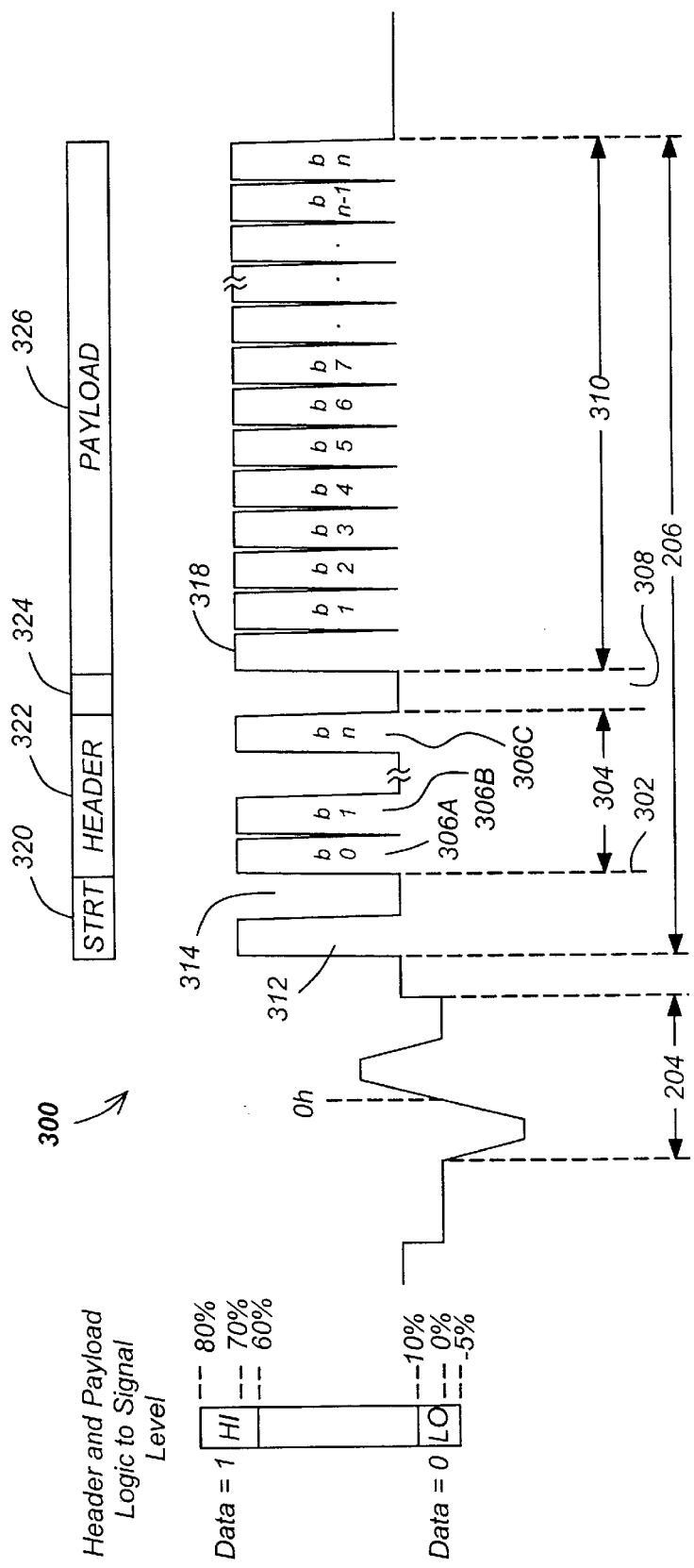
FIG. 3 is a diagram of one embodiment of a component waveform for a video signal having auxiliary data.

FIG. 3 is a diagram of one embodiment of a component waveform 300 for a video signal as described by the present invention. Following the horizontal pulse 204, the active video region 206 of the component waveform 300 of the video signal comprises a data reference portion 322 during a data reference interval 304 and an auxiliary data payload portion 326 during a data auxiliary payload interval 310. The data reference or header portion 322 comprises a plurality of pulses 306A–306C (collectively referred to hereinafter as pulse(s) 306) at a baseline reference frequency that can be received and decoded by all video presentation devices 124 that are configured to receive auxiliary data. In FIG. 3, as well as FIGS. 4A and 4B which follow, the video component signal level of the header portion 322 and payload portion 326 may or may not be offset from the level of the synchronization pulse 204. The pulses in the data reference portion 322, which represent N bits (where N is an integer greater than one) are coded to provide information regarding a protocol for the auxiliary data to be provided on the component waveform, including the clock rate at which the auxiliary data will be presented in the auxiliary data payload portion 326. In one embodiment, the data reference portion 322 comprise a sufficient number of bits (represented by pulses 306) to define other protocol parameters as well, such as a symbol set for the auxiliary data. Optionally, the data reference portion 322 is preceded by a start symbol portion 320 during data start interval 302. Also, the pulses 306 in the data reference portion 322 may begin after the start of active video 206. Also, a blank region 308 (corresponding to blank region 324) of any desired length may be inserted between the pulses 306 of the data reference portion 322 and the pulses 318 of the auxiliary data payload portion 326. For illustrative purposes, width of the pulses in the auxiliary data portion 310 can be of different forms than that which is illustrated in FIG. 3.

FIG. 3 also shows an exemplary relationship between the signal level of the component signal 300 and the logical data represented by the signal. Nominally, a logical low state is represented by a signal level between −5% of the maximum signal level and 10% of the maximum signal level. Similarly, a logical high state is represented by a signal level between 60% and 80% of the maximum signal level.

The duration of the first pulse 312 and the second pulse 314 of the start portion 320 is S·T, the duration of the pulses 306 of the data reference portion 322 are all approximately H·T. In an embodiment of the invention suitable for standard definition television, the values for S, H, and T are defined in accordance with Table 1 below.

TABLE 1

| Standard Definition TV Component Interface | YPbPr |
|---|---|
| Position of Data Services Waveform | VBI Line 41 (480 p) |
| Video Start Line | VBI Line 43 (480 p) |
| Display Clock | 27 MHz for 59.94 Hz (Display period T = 1/27 × 10⁶ seconds) |
| Start Symbol Data Symbol Width (S) | 26 clock cycles (0.963 μsec) |
| Start Symbol Position (from 0 h) | 156 clock cycles |
| Data Reference Portion Symbol Width (H) | 26 clock cycles (0.963 μsec) |
| Start Symbol and Header Data Symbol Tolerance | ±30 nanoseconds |
| Start Symbol and Header Data Symbol Maximum Rise/Fall Time | 50 nanoseconds |
| Header Data Bits Per Symbol | 1 (bi-level) |
| Number of Header Data Symbols | 6 |
| Logical High (bit "1") | 70% white peak ±10% |
| Logical Low (bit "0") | 0% blanking level ±10%, −5% |

In one embodiment of the present invention, the values of the pulses in the data reference portion 322 are used to implement a copy generation management system (CGMS) and are defined according to Table 2, below.

TABLE 2

| Service Name | Value (decimal) | $b_0$ | $b_1$ | $b_2$ | $b_3$ | $b_4$ | $b_5$ |
|---|---|---|---|---|---|---|---|
| | | | | Address Field | | | |
| CGMS | 0 | 0 | 0 | 0 | 0 | 0 | 0 |
| High-Rate Example | 1 | 0 | 0 | 0 | 0 | 0 | 1 |

For a CGMS including an analog protection system (APS), CGMS payload data may be defined as described in Table 3 below:

TABLE 3

| $b_0$ | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ |
|---|---|---|---|---|---|---|---|---|---|---|---|---|---|
| Name | CGMS | | APS | ASB | Reserved | | | | | CRCC | | | | wherein bits $b_8$–$b_{13}$ represent cyclic redundancy check code (CRCC) bits. The CGMS bits and analog protection system (APS) bits have the meaning presented in Tables 6 and 7 below (the meaning of the analog source bit (ASB) is reserved).

TABLE 4

| Payload Bits $b_0$, $b_1$ | CGMS Definition |
|---|---|
| 0, 0 | Copying is permitted without restriction |
| 0, 1 | One generation copy has been made and no further copies are permitted |
| 1, 0 | One generation copies may be made |
| 1, 1 | No copying is permitted |

TABLE 5

| Payload Bits $b_2$, $b_3$ | APS Definition |
|---|---|
| 0, 0 | No APS |
| 0, 1 | Pseudo Sync Pulse (PSP) On; Split Burst Off |
| 1, 0 | Pseudo Sync Pulse (PSP) On; 2 line Split Burst On |
| 1, 1 | Pseudo Sync Pulse (PSP) On; 4 line Split Burst On |

Figure 4A:
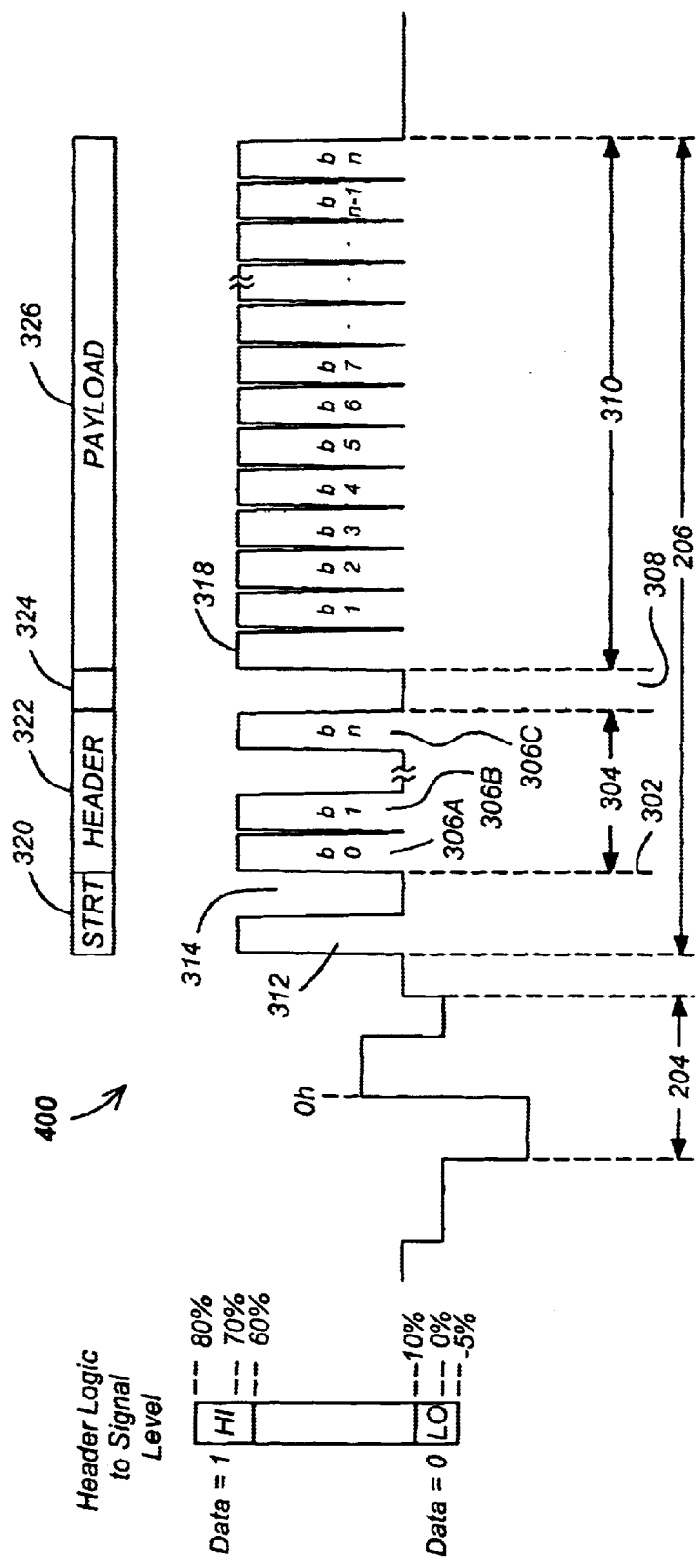
FIG. 4A is a diagram illustrating another embodiment of a component waveform for a video signal having CGMS auxiliary payload data.
Figure 4B:
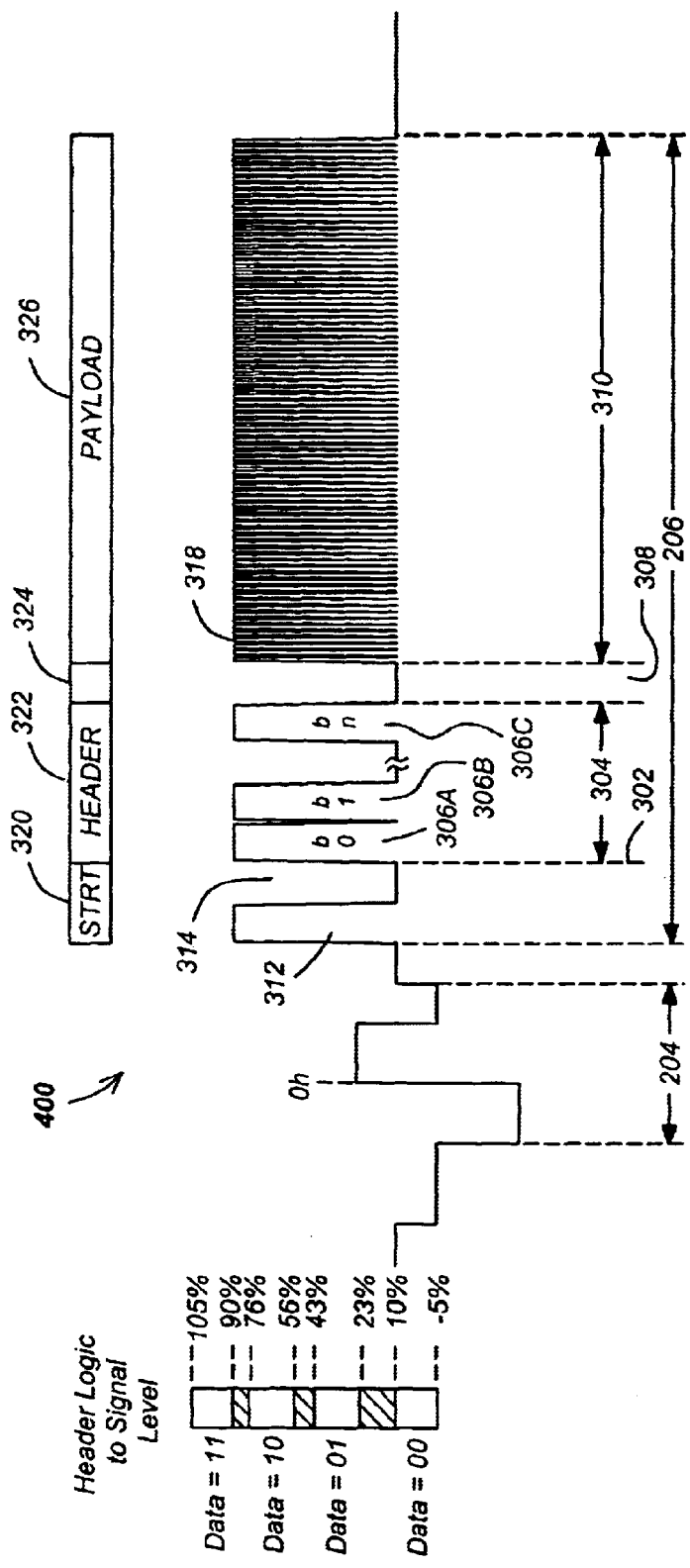
FIG. 4B is a diagram illustrating an embodiment of a component waveform for a video signal having high-rate auxiliary payload data.

FIG. 4A is a diagram illustrating another embodiment of a component waveform 400 for a video signal having CGMS auxiliary payload data. FIG. 4B is a diagram illustrating another embodiment of a component waveform 400 for a video signal having a high rate payload auxiliary payload data.

As was the case with the component waveform shown in FIG. 3, the duration of the first pulse 312 and the second pulse 314 of the start portion 320 is S·T, the duration of the pulses 306 of the data reference portion 322 are all approximately H·T. In an embodiment of the invention suitable for high definition television, the values for S, H, and T may be defined in accordance with Table 6 below.

TABLE 6

| HDTV Component Interface | YpbPr |
|---|---|
| Position of Data Services Waveform | VBI Lines 19 and 582 (1080i) or VBI line 24 (720p) |
| Video Start Line | VBI Lines 21 and 584 (1080i) or VBI line 26 (720p) |
| Display Clock | 74.25 MHz for 60 MHz (Display period T = 1/74.25 × 10⁶ seconds) |
| Start Symbol Data Symbol Width (S) | 77 clock cycles or 1.038 μsec (1080i) 58 clock cycles or 0.782 μsec (720p) |
| Start Symbol Position (from 0 h) | 308 clock cycles or 4.152 μsec (1080i) 232 clock cycles or 3.128 μsec (720p) |
| Data Reference Portion Symbol Width (H) | 77 clock cycles or 1.038 μsec (1080i) 58 clock cycles or 0.782 μsec (720p) |
| Start Symbol and Header Data Symbol Tolerance | ±30 nanoseconds |
| Start Symbol and Header Data Symbol Maximum Rise/Fall Time | 50 nanoseconds |
| Header Data Bits Per Symbol | 1 (bi-level) |
| Number of Header Data Symbols | 6 |
| Logical High (bit "1") | 70% white peak ±10% |
| Logical Low (bit "0") | 0% blanking level ±10%, −5% |

In the exemplary component waveform 300 of FIG. 4A, the data reference portion 304 pulses 306 specified a first (and low) clock frequency for the data in the auxiliary data portion 310, hence, a relatively low number of pulses ($b_n$) are described therein.

In the exemplary component waveform 400 of FIG. 4B, the pulses 306 in the data reference portion 322 specify an auxiliary data protocol in which the clock rate is increased from that which is illustrated in FIG. 4A. Accordingly, the auxiliary data portion 326 includes a greater number of pulses 318, and generally carries a greater amount of information that was included in the auxiliary data portion 310 presented in FIG. 3. The duration of the pulses 318 of the auxiliary data payload portion 326 is all approximately P·T, in accordance with Table 7 below.

TABLE 7

| Characteristic | CGMS Payload | High-Rate Payload |
|---|---|---|
| Payload Data Portion Symbol Width (P) | 77 clock cycles or 1.038 μsec (1080i) 58 clock cycles or 0.782 μsec (720p) 26 clock cycles or 0.963 μsec (480p) | 38.5 clock cycles or 0.519 μsec (1080i) 29 clock cycles or 0.391 μsec (720p) 13 clock cycles or 0.476 μsec (480p) |
| Payload data Symbol Tolerance | ±30 nanoseconds | ±30 nanoseconds |
| Payload Data Symbol Maximum Rise/Fall Time | 50 nanoseconds | 50 nanoseconds |
| Payload Data Bits Per Symbol | 1 (bi-level) | 2 (4-level) |
| Number of Payload Data Symbols | 14 (n = 13) | 28 (n = 27) |
| Logic to Signal Level | Bit "1" = 70% white peak ±10% Bit "0" = 0% blanking level +10%, −5% | Bit "11" = 100%, +5%, −10% Bit "10" = 66% ± 10% Bit "01" = 33% ± 10% Bit "00" = 0, +10%, −5% |

The auxiliary data portion 310 can be used to provide a wide variety of data to the user, via one or more of the presentation devices 122, 124 and 126, including lower data rate services (such as closed captioning and the copy protection information described above), and higher data rate services (such as data and graphics associated with the video content of the signal, weather, and stock quotes). At the same time, it allows older, standardized waveforms and data rates (complying with older protocols) to be carried, allowing easier implementation of digital data services to receiving devices with low data rate capabilities. Accordingly, both high data rate (10s and 100s of times greater than 1 Kbps) signals and low data rate signals (approximately 1 Kbps or less) can be provided on the same portion of a video signal. This allows a hierarchy of receiver capabilities, in which those with strong cost constraints can use low cost implementations that can receive only the low data rate transmissions, and other receivers with less demanding cost constraints can receive both high and low data rate transmissions.

Figure 5:
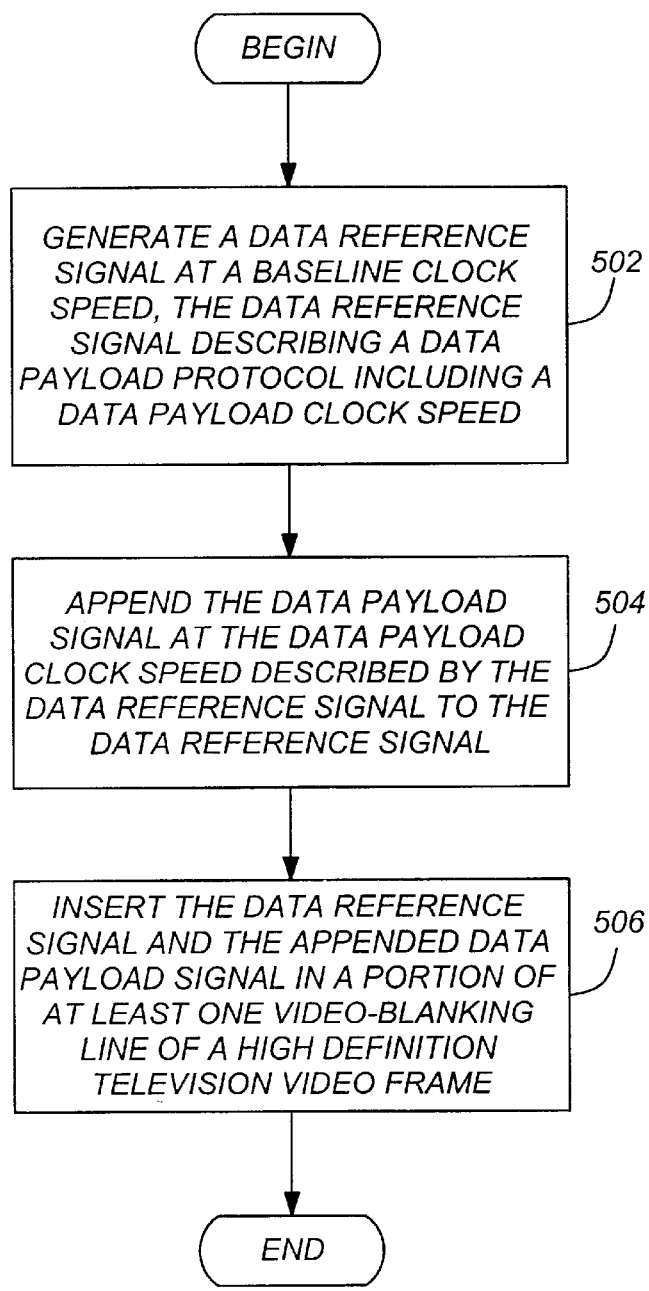
FIG. 5 is a flow chart presenting method steps that can be used to practice one embodiment of the present invention.

FIG. 5 is a flow chart presenting an illustrative embodiment of method steps that can be used to practice the present invention. A signal comprising data reference signal portion 322 is generated at a baseline clock speed, as shown in block 502. The data reference signal portion 322 describes a data payload portion 326 protocol, including a data payload portion 326 clock speed. A data payload signal portion 326 is appended to the data reference signal, as shown in block 504. The data payload signal portion 326 is provided according to a protocol (including, for example, the clock speed) as described by the data reference signal portion 322. The data reference signal portion 322 and appended data payload signal portion 326 are then inserted into at least one video blanking line of a video frame, as shown in block 506. In one embodiment of the present invention, the video frame comprises an active video portion 206 a HDTV video frame.

Figure 6:
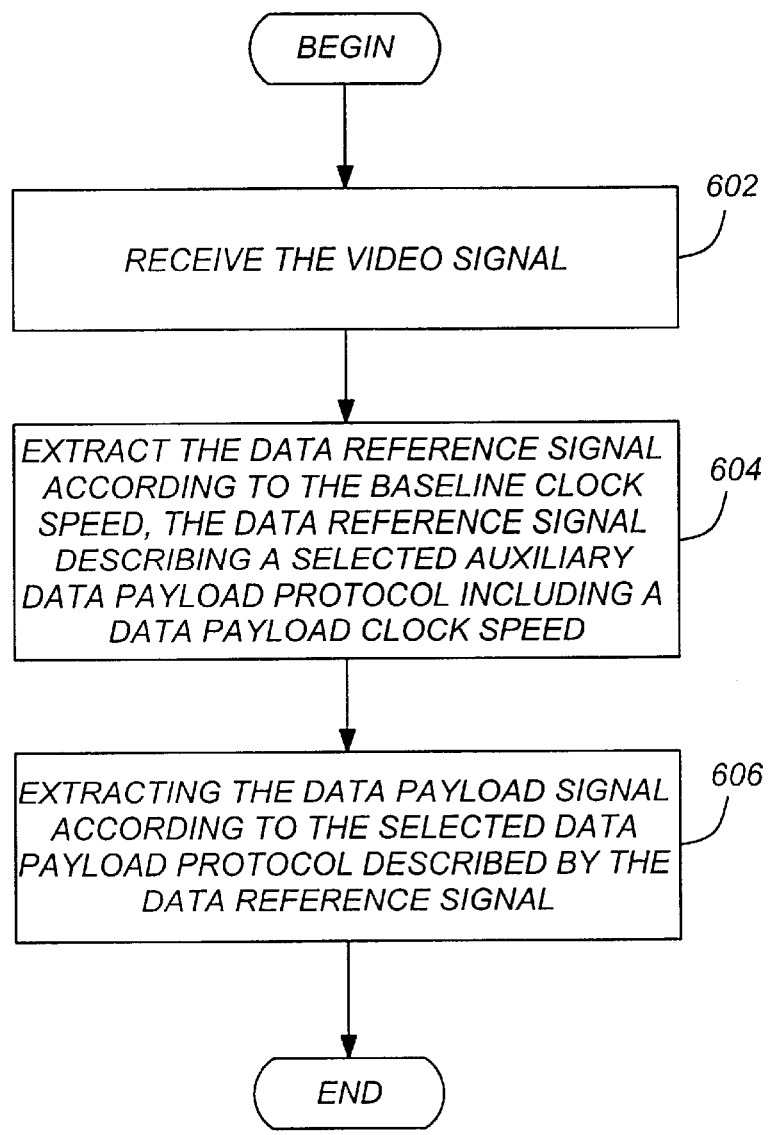
FIG. 6 is a flow chart presenting an illustrative embodiment of method steps that can be used to practice another embodiment of the present invention.

FIG. 6 is a flow chart presenting another illustrative embodiment of method steps that can be used to practice the present invention. A component video signal is received 602. A data reference signal portion 322 is extracted from the component video signal according to a baseline clock speed, as shown in block 604. The data reference signal portion 322 describes a selected auxiliary data payload portion 326 protocol including a data payload clock speed. The information in the data payload signal portion is then extracted according to the selected payload protocol described by the data reference signal portion 322, as shown in block 606.

Figure 7:
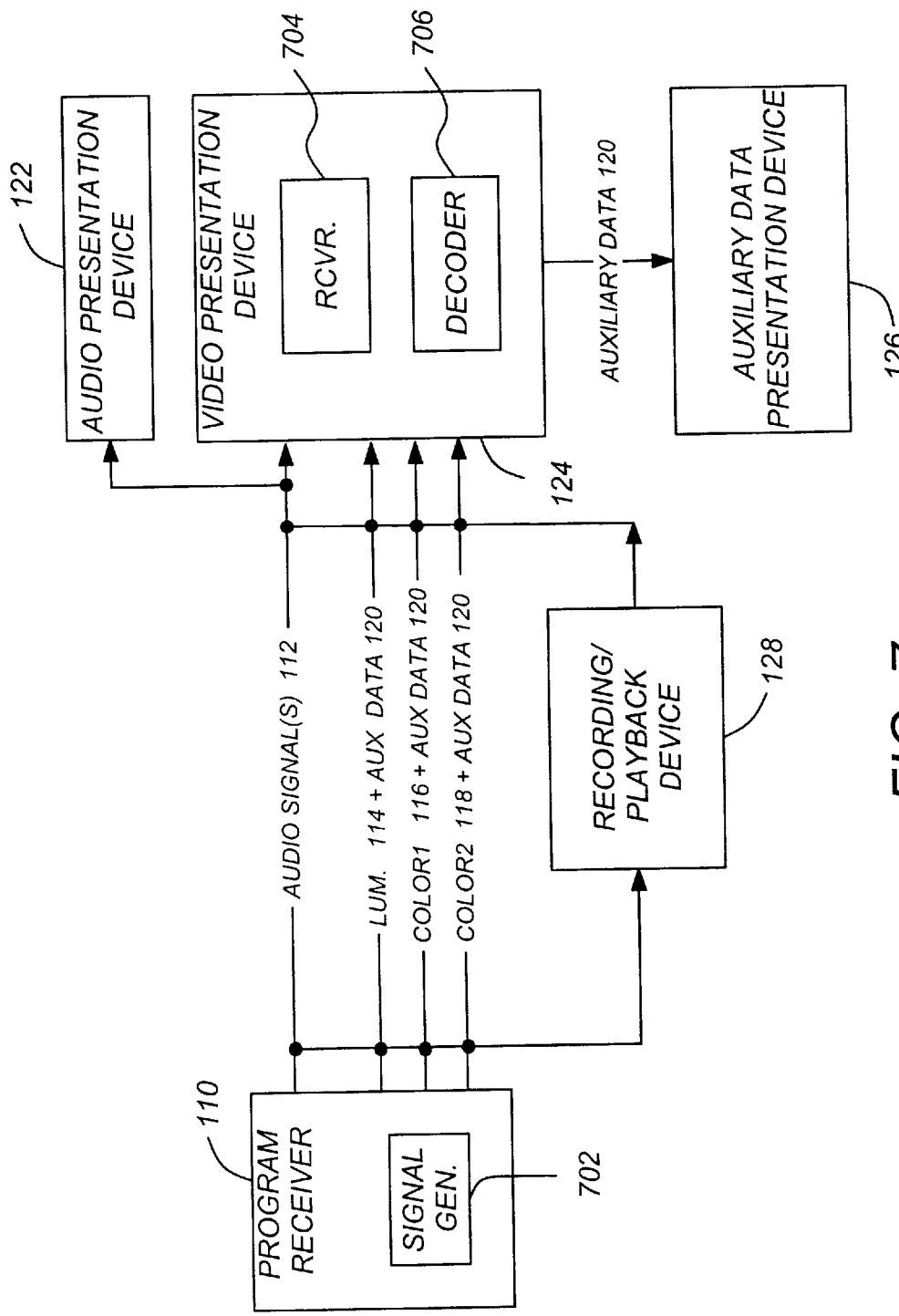
FIG. 7 is a diagram showing a hardware implementation of the present invention.

FIG. 7 is a diagram showing a hardware implementation of the present invention. The program receiver 110 comprises a signal generator 702 that generates the audio signal (s) 112, luminance signal 114, and color signals 116, 118 and transmits these signals to the video presentation device 124. In this embodiment, auxiliary data is transmitted to the video presentation device 124 via the luminance signal 114 during the VBI. The luminance signal 114 includes a data reference signal generated at a baseline clock speed compliant with one or more data protocols, and describes a selected auxiliary data protocol, including, for example the clock speed for the auxiliary data. The receiver 704 in the video presentation device receives the video signal, and the decoder 706 extracts the data reference signal according to the baseline clock speed, and the data payload signal according to the selected auxiliary data payload protocol. The foregoing signal generator 702, receiver 704, and decoder 706 can be implemented within the program receiver 110, the video presentation device 124, and the auxiliary data presentation device 126 in any combination. The foregoing operations may also be performed with dedicated hardware elements, or may be implemented via a computer performing instructions tangibly embodied in a storage device such as a floppy disk, read only memory (ROM), random access memory (RAM), or similar device. The instructions for performing such instructions may be downloaded to the program receiver 110, the video presentation device, or the auxiliary data presentation device 126 via the Internet or other communication line.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, the values and data presented in Tables 1–7 present an illustrative example of one possible embodiment of the invention. Other data definitions are possible and are within the scope of the present invention. Further, although the present invention has thus far been described in terms of HDTV, the foregoing principles are applicable to other formats as well. In particular, the present invention can be used with any component video interface, including standard definition and high definition (those exceeding the standard 480 line interlaced resolution) formats as well. Still further, component video can take a number of different forms, including those having a video signal separated into red, green, and blue (RGB) components and those having the video signal separated into Y, Pr, and Pb components. Hence, It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of generating a video signal having an auxiliary data payload complying with a data payload protocol selectable from at least two available data payload protocols, comprising the steps of:
   generating a data reference signal at a baseline clock speed compliant with the two data protocols, the data reference signal describing a selected auxiliary data payload protocol including an auxiliary data payload clock speed;
   appending the auxiliary data payload signal at the auxiliary data payload clock speed described by the data reference signal to the data reference signal; and
   inserting the data reference signal and appended auxiliary data payload signal in a portion of at least one line of a video frame.

2. The method of claim 1, wherein the line of the video frame is a video-blanking line.

3. The method of claim 1, wherein the portion of the video-blanking line comprises an active video portion of a high definition television (HDTV) video signal.

4. The method of claim 1, wherein the auxiliary data payload comprises video signal copy control information.

5. The method of claim 1, wherein the auxiliary data payload comprises closed captioning information related to the video signal.

6. The method of claim 1, wherein the auxiliary data payload protocol described in the data reference signal further comprises a symbol set.

7. A method of receiving an auxiliary data payload on a video signal representing at least one line of a video frame, the auxiliary data payload complying with a data payload protocol selectable from at least two available data payload protocols comprising the steps of:
   receiving the video signal, the video signal comprising the auxiliary data payload appended to a data reference signal;
   extracting the data reference signal according to a baseline clock speed, the data reference signal describing a selected auxiliary data payload protocol including a data payload clock speed; and
   extracting the auxiliary data payload according to the selected auxiliary data payload protocol described by the data reference signal.

8. The method of claim 7, wherein the received video signal represents a video blanking line of the video frame.

9. The method of claim 7, wherein the data reference signal is extracted from the active video portion of a high definition television (HDTV) video signal.

10. The method of claim 7, wherein the data payload comprises video signal copy control information, and the method further comprises the step of:
    controlling access to the video signal according to the copy control information.

11. The method of claim 7, wherein the data payload comprises closed captioning information related to the video signal.

12. The method of claim 7, wherein the data payload protocol described in the data reference signal further comprises a symbol set.

13. An apparatus of generating a video signal having an auxiliary data payload complying with a data payload protocol selectable from at least two available data payload protocols, comprising:
    a generator, for generating at least one line of a video frame having a data reference signal at a baseline clock speed compliant with the two data protocols and an appended auxiliary data payload; and
    wherein the data reference signal is compliant with the two data protocols and describes a selected auxiliary data payload protocol including the auxiliary data payload clock speed.

14. The apparatus of claim 13, wherein the line of the video frame is a video-blanking line.

15. The apparatus of claim 13, wherein the portion of the video-blanking line comprises an active video portion of a high definition television (HDTV) video signal.

16. The apparatus of claim 13, wherein the auxiliary data payload comprises video signal copy control information.

17. The apparatus of claim 13, wherein the auxiliary data payload comprises closed captioning information related to the video signal.

18. The apparatus of claim 13, wherein the auxiliary data payload protocol described in the data reference signal further comprises a symbol set.

19. An apparatus of receiving an auxiliary data payload on a video signal representing at least one line of a video frame, the auxiliary data payload complying with a data payload protocol selectable from at least two available data payload protocols comprising:
    a receiver for receiving the video signal, the video signal comprising the auxiliary data payload appended to a data reference signal;
    a decoder communicatively coupled to the receiver, for extracting the data reference signal according to a baseline clock speed, and for extracting the auxiliary data payload according to a selected auxiliary data payload protocol described by the data reference signal; and
    wherein the data reference signal describes the selected auxiliary data payload protocol including a data payload clock speed.

20. The apparatus of claim 19, wherein the received video signal represents a video blanking line of the video frame.

21. The apparatus of claim 19, wherein the data reference signal is extracted from the active video portion of a high definition television (HDTV) video signal.

22. The apparatus of claim 19, wherein the data payload comprises video signal copy control information, and the method further comprises:
    means for controlling access to the video signal according to the copy control information.

23. The apparatus of claim 19, wherein the data payload comprises closed captioning information related to the video signal.

24. The apparatus of claim 19, wherein the data payload protocol described in the data reference signal further comprises a symbol set.

25. The apparatus of claim 19, wherein the data payload protocol described in the data reference signal further comprises a symbol set.

26. A signal for transmitting an auxiliary data payload complying with an auxiliary data payload protocol selectable from at least two available data payload protocols, the signal formed by performing the steps of:
    generating a data reference signal at a baseline clock speed compliant with the two data protocols, the data reference signal describing a selected auxiliary data payload protocol including an auxiliary data payload clock speed;
    appending the auxiliary data payload signal at the auxiliary data payload clock speed described by the data reference signal to the data reference signal; and
    inserting the data reference signal and appended auxiliary data payload signal in a portion of at least one line of a video frame.

* * * * *